March 28, 1939. D. A. MEEKER ET AL 2,151,862
FOOD HANDLING APPARATUS
Filed May 29, 1933 5 Sheets-Sheet 1

INVENTOR
David A. Meeker
and John C. Slager
BY Maréchal & Noe
ATTORNEY

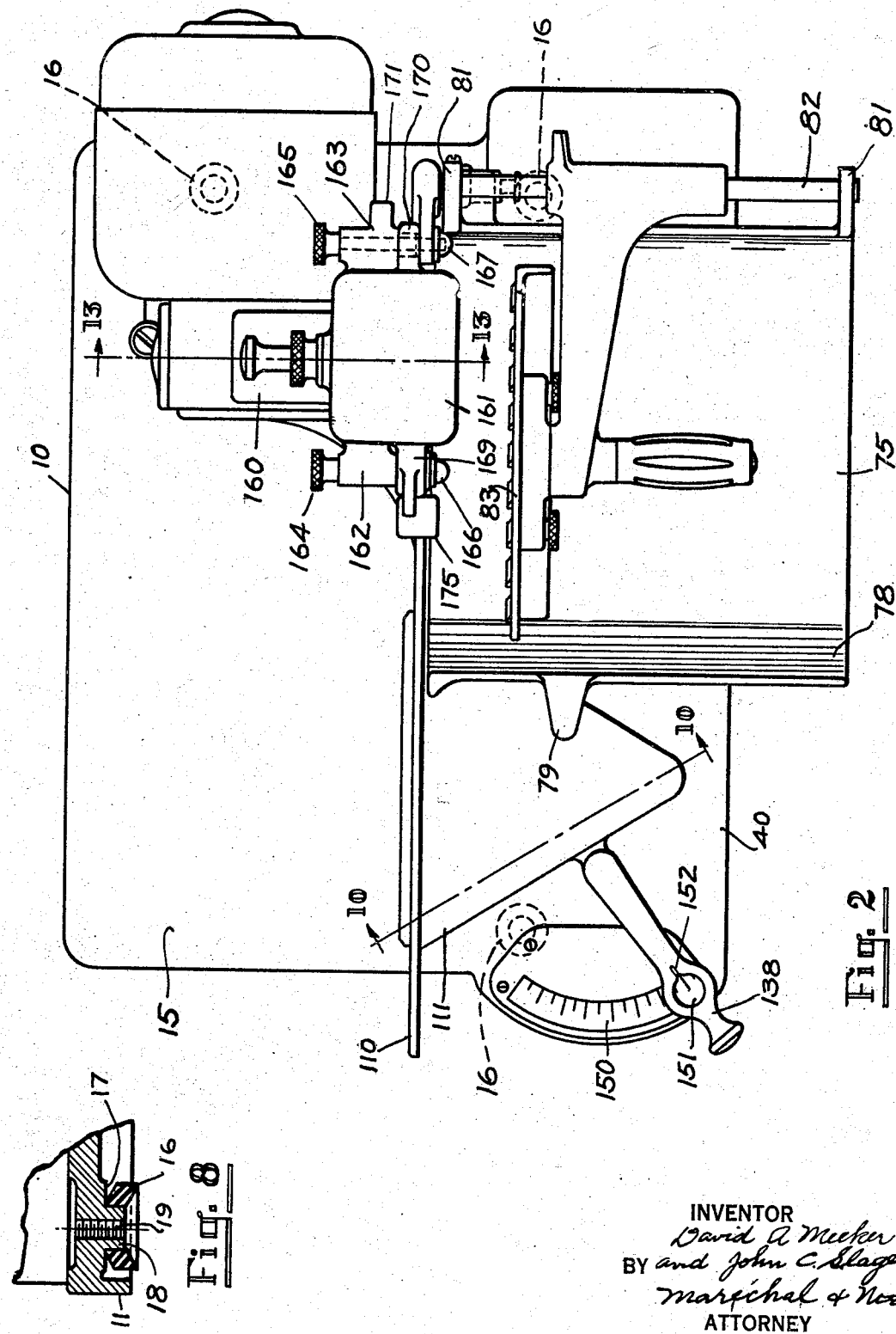

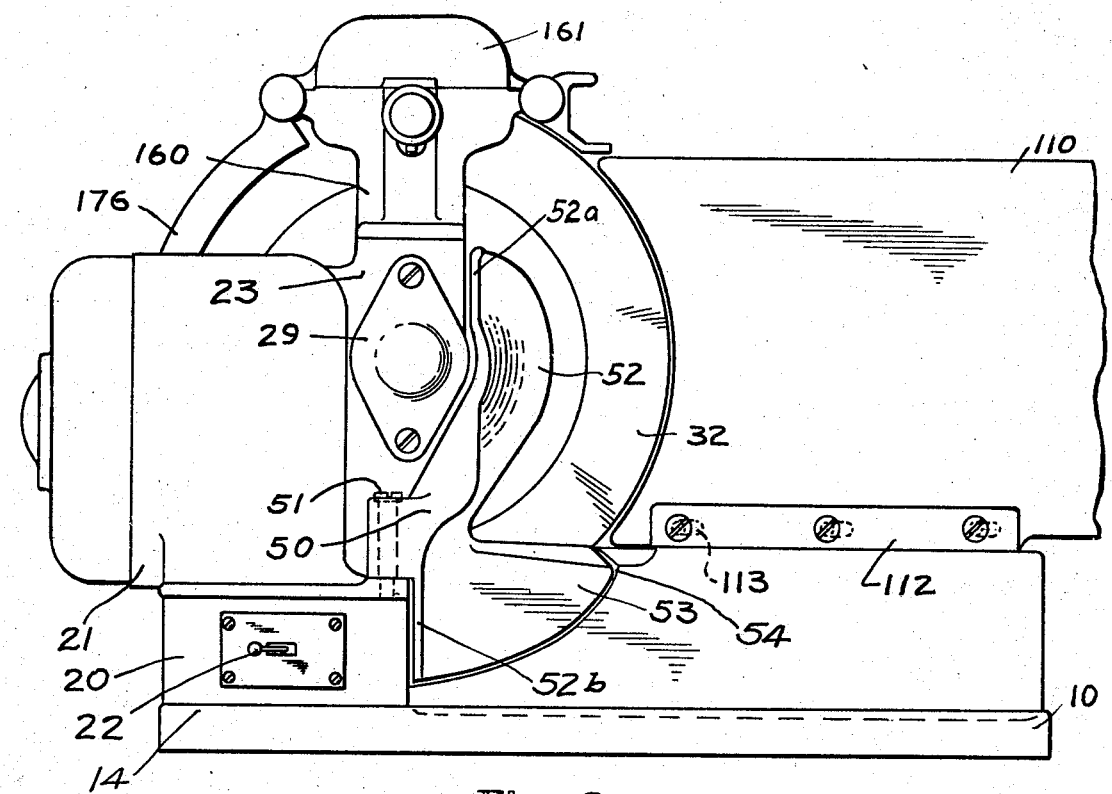
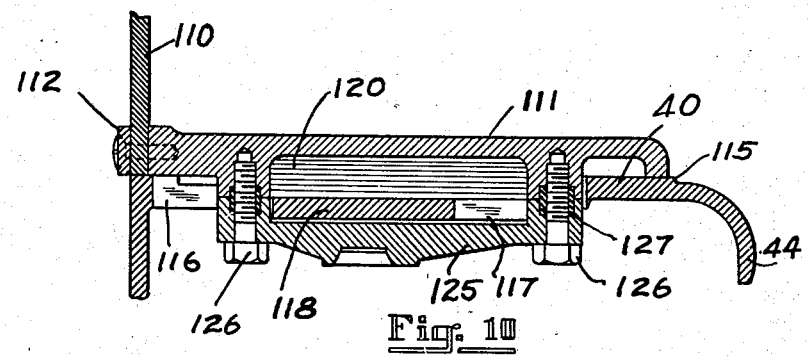
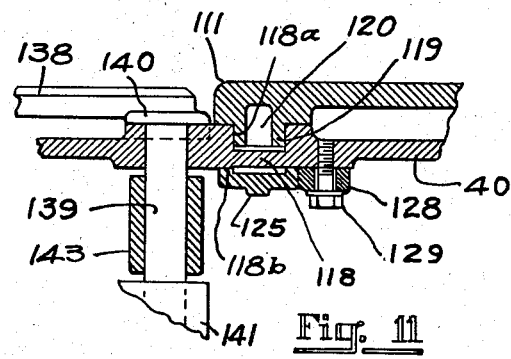

March 28, 1939.  D. A. MEEKER ET AL  2,151,862

FOOD HANDLING APPARATUS

Filed May 29, 1933  5 Sheets-Sheet 5

INVENTOR
David A. Meeker
BY and John C. Slager
Maréchal & Noe
ATTORNEY

Patented Mar. 28, 1939

2,151,862

UNITED STATES PATENT OFFICE 2,151,862

FOOD HANDLING APPARATUS

David A. Meeker and John C. Slager, Troy, Ohio, assignors to The Hobart Manufacturing Company, Troy, Ohio, a corporation of Ohio Application May 29, 1933, Serial No. 673,444

20 Claims. (Cl. 146—102)

This invention relates to food handling equipment and more particularly to a slicing machine of the type adapted to slice meat and the like.

One of the principal objects of the invention is to provide a light weight slicing machine which is simple in construction and efficient and effective in operation.

Another object is to provide an inexpensive construction of slicing machine which is effective to prevent food particles from getting underneath the base of the machine or upon connected operating parts thereof to cause an unsanitary condition.

A further object is to provide mounting and adjusting mechanism for the gage plate of such a machine, which is simple and strong in construction, easy and accurate in operation and effective to prevent access of food particles, etc., thereinto or therethrough.

It is a further object to provide means for supporting the carriage and for shielding the said supporting means while providing that the carriage can be quickly and easily detached for cleaning purposes or when it is desired to use the machine without a carriage.

It is a further object to provide a slicing machine having the slice tray positioned so low with reference to the cutting arc of the knife that standard trays such as are used by butchers, may be placed on the slice tray in position such that the sliced material will fall directly thereinto.

Other objects and advantages will be apparent from the detailed description, the accompanying drawings, and the appended claims.

In the drawings,

Fig. 2 is a plan view of the machine;

Fig. 3 is a view in elevation from the rear side of the machine;

Fig. 8 is a detail view showing one of the flexible and frictional supporting members;

Fig. 10 is a partial vertical section taken on the line 10—10 of Fig. 2;

Fig. 11 is a partial vertical section on line 11—11 of Fig. 6;

Figure 12:
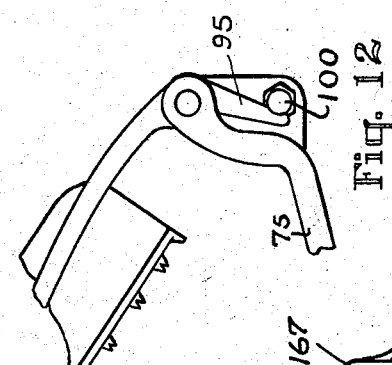
Fig. 12 is a fragmentary view showing the pusher plate latched up in inoperative position.

In copending application Serial No. 422,746, filed January 23, 1930, now Patent No. 1,944,181, dated January 23, 1934, and assigned to the same assignee as this application, there is shown a slicing machine having provision for insuring that a maximum of sanitation is obtained, and to this end a base is provided about which there extends a peripheral flexible sealing strip which is adapted to rest in contact with the supporting surface. The present invention, however, is directed to a less expensive, light weight machine in which the relatively expensive sealing construction of this prior invention is not used, but an effective seal is provided nevertheless so that food particles can not get under the base, either through the machine or from the outside to produce an unsanitary condition under the base, a part of the machine which may be seldom inspected or cleaned. Furthermore the same construction makes it practically impossible for any contaminating material that should be under the base, to come into contact with the food being treated by the machine. Moreover, not only is the base protected against an unsanitary condition, but the entire machine has been constructed for high sanitation, for a maximum of utility characteristics, and at the same time in an inexpensive manner.

Referring to the drawings which disclose a preferred embodiment of the invention, there is shown a main base member 10. This member is provided with a downwardly turned integral peripheral flange 11 extending entirely around the same, which flange serves to provide an effective seal and to prevent access of material underneath the base. The base is provided with forwardly extending portions 12 and 13, integrally formed therewith and with a portion 14 adapted to form the support for the motor assembly. The top surface of the base is also slightly dished as shown at 15 for the purpose of serving as a slice tray. Inasmuch as the slice tray is located very close to the table top or other surface on which the machine is placed, it is practically impossible for the material when sliced to slide off the tray, and likewise the tray provides adequate support for the standard size butcher's tray so that the tray can be placed directly on the base and the materials sliced thereinto. The tray is positioned relatively below the knife so that there is adequate room on the tray for stacking.

The material of which the base is cast, is preferably a light weight material such as an alloy of aluminum, and this same material is used throughout the construction of the device so that the completed machine is relatively very light in weight as compared with previous machines of this character.

It has been found with a light weight machine of this type, that incident to the reciprocating motion of the work past the cutting knife, the machine is apt to slide, especially when mounted upon one of the usual supporting surfaces, such as a smooth surface of glass, vitrolite, enamel, or the like. In order to overcome this tendency, means having a greater coefficient of friction than the base, comprising a plurality of frictional elements, are provided, one of which is indicated at 16, Fig. 8. The base is provided with a machined surface 17, and a downwardly extending lug 18 stopping short of the peripheral base flange 11. The member 16 is preferably a rubber washer of suitable resiliency frictionally mounted on the part 18 so that its lower face when uncompressed extends below the peripheral flange 11 as indicated. When, however, the machine is placed upon a support, the frictional member 16 first engages the support and is deformed until the flange 11 rests upon the support. In this way a portion only of the weight is carried by the frictional member 16 and the remainder is carried by the peripheral flange. This portion of the weight, however, is sufficient to give increased frictional effect and it is found that this eliminates any objectionable sliding motion in the normal operation of the machine. Preferably three such supports are provided, two being located under the heavier end of the machine, and the third being located under the opposite end as indicated in dotted lines in Fig. 2. The proportion of the weight carried by the frictional member to that carried by the peripheral flange can be easily varied in any case by changing the relative depth of the machined face 17 as compared with the peripheral flange, or by changing the resiliency characteristics of the frictional members. It is preferred to so proportion these parts that the major part of the weight is carried by the frictional members and a minor part by the peripheral flange; in this way sufficient weight is carried by the flange to make it an effective seal and the frictional effect is increased to a maximum.

If desired the same projection 18 may be provided with internal screw threads 19 to provide for mounting the device when it is shipped, or to be attached permanently to a base or table, suitable attaching screws being inserted through the base and the machine being bolted thereto in this manner. The use of three such supports is of particular advantage insofar as the shipping of the machine is concerned as it prevents the twisting strains in shipment producing any destructive or damaging twisting or torsion of the machine base, when it is supported in this manner.

The base carries a main frame member, a portion of which forms a motor support 20. This main frame may be similarly cast of the light weight alloy, and the motor assembly 21 is mounted directly thereon, a suitable motor control switch 22 being positioned in the support. The motor assembly 21 is provided with an integral housing 23 which also covers the extended end 24 of the motor shaft which carries a driving worm 25.

Extending at right angles to the motor shaft and likewise journaled in the housing 23 is a knife shaft 26, supported in spaced antifriction bearings 27, the knife shaft being provided with a gear 28 meshing in driving relationship with the motor worm gear 25. A removable plate 29 attached to the housing 23 provides ready access to the above described driving connections.

A rotary slicing knife 30 is fastened to the overhanging end of the knife shaft 26 which likewise carries suitable sealing means 31 preventing escape of the lubricant. This rotary knife is formed with a beveled peripheral portion 32 on its rearward side and a recess 33 on its forward face.

The main frame is extended and in addition to the motor support portion 20 is formed integrally with an overhanging cover plate or housing portion 40, extending beyond the forward face of the knife. The entire main frame is bolted directly to the base 10 and is also provided at opposite ends with downward extensions 41 and 42 resting upon forwardly extending portions 12 and 13 respectively of the base. On its forward side the cover portion 40 is formed with a downwardly turned flange 44. This housing or cover plate is without holes or perforations throughout its extent, with the exception of the portion providing for the support of the gage plate, which construction will be described more in detail hereafter.

Figure 4:
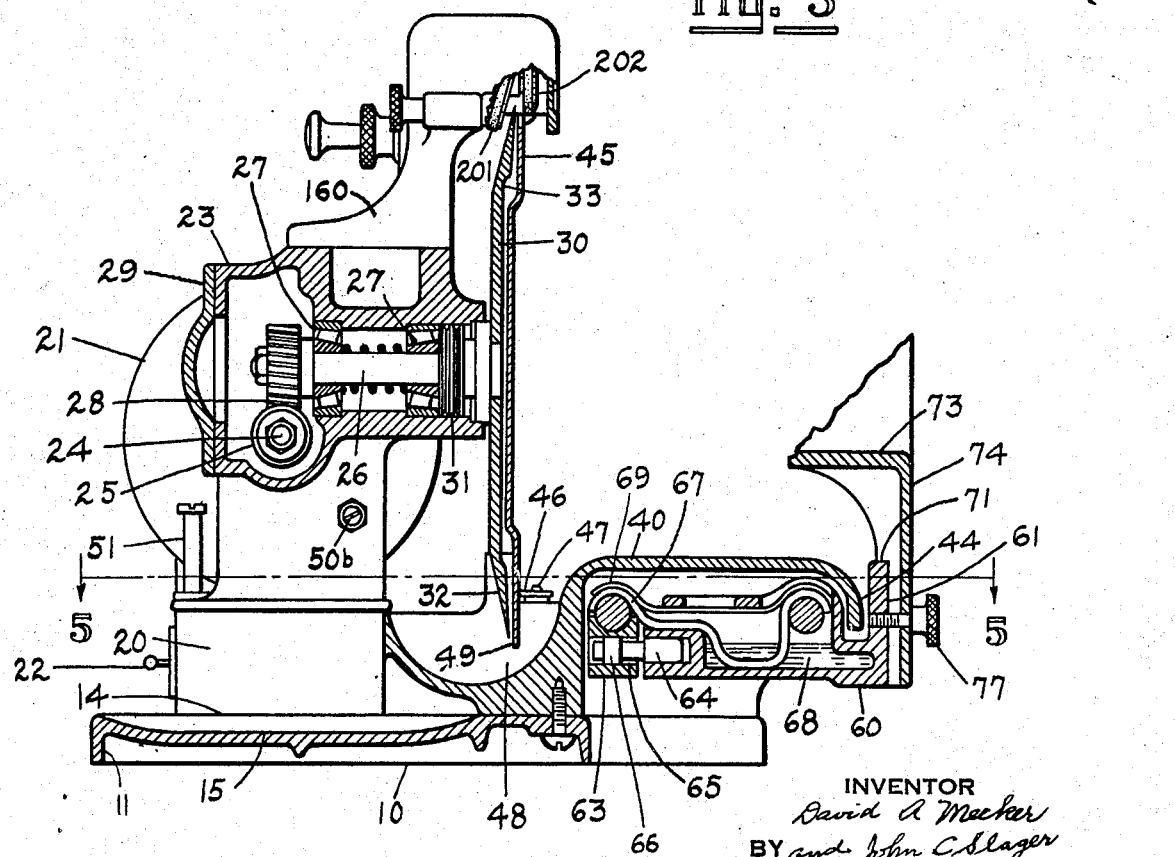
Fig. 4 is a vertical sectional view on line 4—4 of Fig. 1, certain parts being broken away to more clearly show the construction.

The guard plate 45 is provided with outwardly turned feet 46 fitting over pins 47 projecting from the cover section 40, thereby providing a removable attaching means for the bottom of the guard plate, holding it in operative position. The guard plate fits within the recess 33 of the knife so that the outer face of the plate and the knife are substantially flush. As shown in Fig. 4, the cover 40 slopes downwardly and toward the rear where it passes under the rotary knife, to provide a collecting trough 48, the purpose being to cause the passage of any particles of food or the like from the front of the machine toward the rear thereof so that the cleaning of the machine is facilitated and all the particles can be collected from the same side of the machine. It will also be seen that the guard plate is positioned very close to the knife face and likewise extends below the knife throughout the extent of the trough as shown at 49. In this way the guard plate serves to protect the knife and to serve as both a front and a rear guard so that the hand of the operator engaged in wiping out the trough 48 will not come in contact with the knife.

A slice deflecting plate 50 is mounted upon the motor housing 23 by means of a pivot 51. This slice deflecting plate is formed with a flat portion which extends substantially perpendicularly toward the rotary knife and adjacent the rear face of the knife the plate is formed with a semiconically curved portion 52. This conically curved portion is so formed that the base of the cone lies closely adjacent the rear face of the knife, radially inward of the beveled portion 32 thereof and with the axis of the cone substantially parallel with the knife axis. The flat portion 52ᵃ of the plate extends downwardly and terminates in an inwardly offset section 52ᵇ adjacent the slice tray 15. The plate is also formed with a section 53 lying practically parallel with the knife and the top surface thereof being substantially horizontal, tapering downwardly toward face 53, and fitting within a recess 54 in the main frame and resulting in the production of a substantially flush rear face. A spring detent 50ᵃ serves to yieldingly hold the plate in operative position in conjunction with a stud 50ᵇ fixed on the motor housing, but provides for swinging the plate out of operative position in order to clean the device. The conically curved portion 52 of the deflector is back of the active cutting arc of the knife and radially inward of the beveled portion thereof, and the curvature given to it is such that as the slice being cut moves into contact with it, the advancing portion of the top of the slice is deflected outwardly and downwardly to cause the slice to curl over as it is being severed, in such manner that it will fall flat upon the slice receiving tray. This is a particularly desirable action in many slicing operations.

Figure 5:
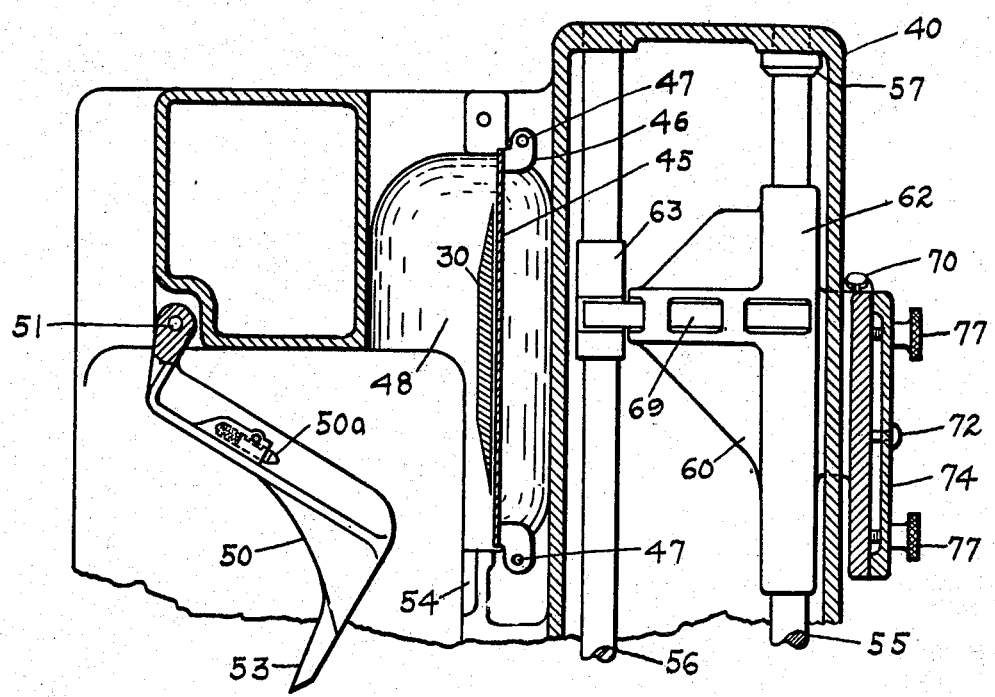
Fig. 5 is a plan view at the knife end of the machine, the upper parts being broken away on the line 5—5 of Fig. 4.

The construction is further of particular advantage in that the lower part of the deflecting plate is offset inwardly so as to provide additional space, or a pocket directly over the slice tray for the placing of a receiving receptacle. If a receiving tray is used over the slice tray 15, such receiving tray may be placed closely adjacent the rear side of the knife with the square corner of the tray extending into the pocket. The conically curved portion does not extend down far enough to contact the edge of a tray of usual depth but serves to deflect the sliced material into the tray in the manner described above. Similarly if it is desired to slice into the hand, the hand may be placed with the fingers extending into the pocket and the curved part of the plate will cause the slices to fall directly into the hand. At all times the portion 53 of the plate effectively guards the cutting edge of the knife while, due to its flush relationship, it does not prevent the close positioning of a receiving means. The plate may be swung away from its operative position for cleaning purposes as shown in Fig. 5 and to provide access to trough 48 for similar cleaning. The deflector plate and the trough are provided throughout with smooth surfaces and are free of corners or pockets in which material could lodge.

A pair of guide rods 55 and 56, arranged substantialy horizontally, are supported from opposite ends of said cover member 40 and adapted to underlie the cover in spaced relation so that they are entirely concealed and protected against access of any material from above the cover. Suitable bumpers 57 of flexible material are provided adjacent the ends of these rods to serve as abutments for the travelling carriage.

A carriage supporting member 60 is slidably mounted upon said rods and is provided with a forward portion 61 adapted to extend laterally beyond the flange 44 of said cover. The supporting member comprises a bearing portion 62 slidably mounted upon rod 55, said bearing being formed integrally with the support. A separate bearing member 63 is slidably mounted upon rod 56 and a connection is provided between the two bearing members which permits a limited movement therebetween to permit variations due to inaccuracies in alignment or the like. This connection comprises a forwardly extending pin 64 fastened to the support 60 and extending within a hole 65 in the bearing member 63. This pin is provided with a central enlarged section 66 of substantially the size of the hole adapted to bear against the walls of the slot to firmly support the device but permitting of a slight relative movement between the two bearing members.

As indicated in Fig. 4, the top section of each of the bearing members 62 and 63 is cut away over a portion thereof to provide a surface for contacting with an oiling wick 67 extending down into a reservoir 68 embodied within the support 60, said wick adapted to overlie each of the rods and thereby to insure constant and adequate lubrication of the same. A spring means 69 overlying each end of the wick serves to maintain the same in desired operative position. A capped filling opening 70 for the reservoir is provided in the support and is easily accessible from the face of the machine.

The outlying supporting face 61 of the carriage support is provided, in addition to the vertically positioned supporting face, with a horizontal supporting face 71. A pin 72 having an enlarged head is mounted in the face 61 adjacent the bottom thereof and extends outwardly therefrom. This construction provides for very readily assembling and removing the work carriage, indicated generally at 73. The carriage is provided with a downwardly extending supporting section 74 and a work-holding section 75. The section 74 is provided with cooperating horizontal and vertical supporting faces, and likewise is formed with a centrally located slot 76 which can be slipped over the pin 72. The enlarged head of the pin therefore, in conjunction with the several cooperating faces on the support, serves to temporarily hold the carriage in operative position. As soon as the carriage has been placed in this position, it is firmly attached to the support by means of thumb screws 77 which bolt the carriage firmly to the support. It is not necessary, however, to support the weight of the carriage while it is attempted to insert the thumb screws, as it is only necessary to interlock the pin 72 and the several cooperating faces whereupon the carriage will be supported in position with the parts aligned to receive the thumb screws. The screws are then easily inserted and tightened and the carriage is then firmly supported in operating position.

Figure 1:
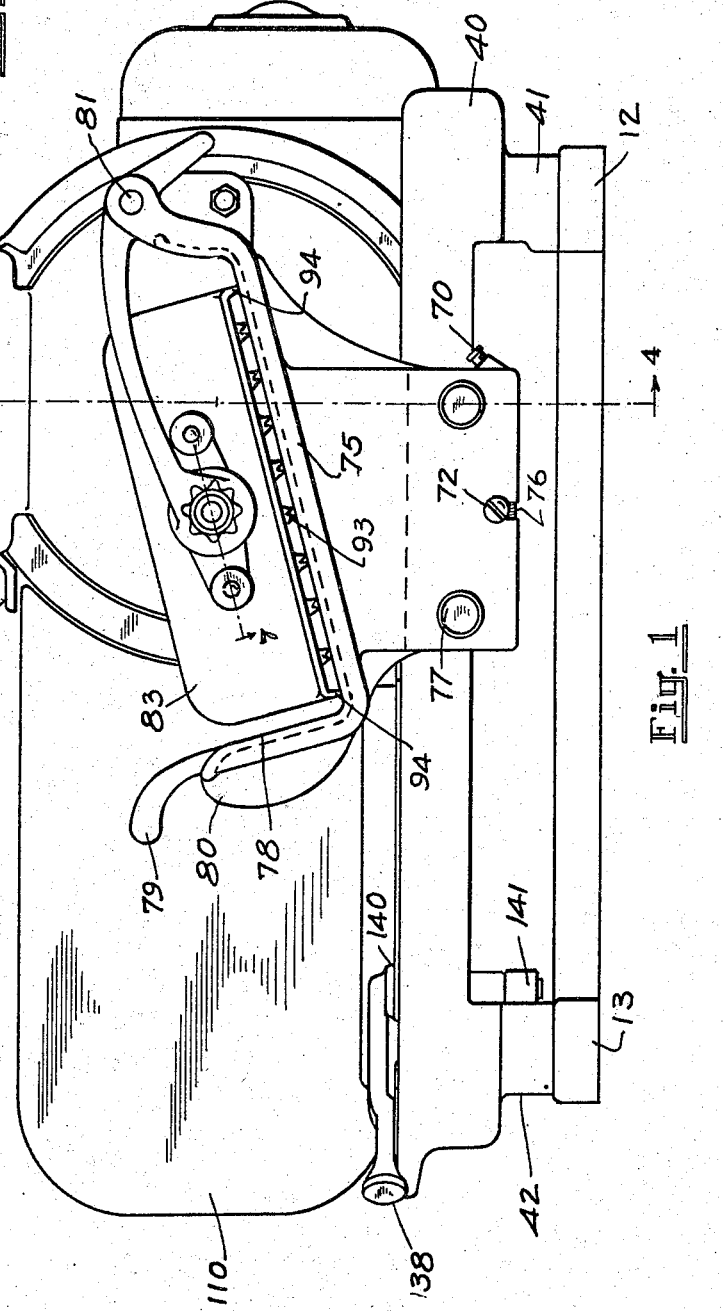
Fig. 1 represents a view in elevation of a food handling device constructed in accordance with the present invention.
Figure 13:
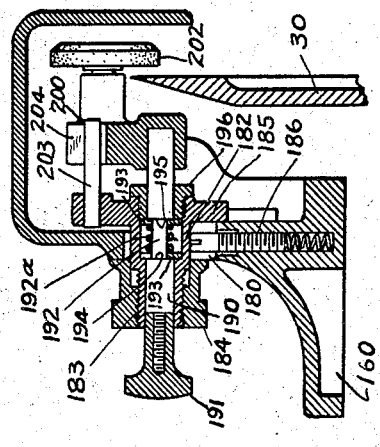
Fig. 13 is a sectional view of the grinding unit taken on the line 13—13 of Fig. 2.

The entire carriage is likewise formed preferably of a unitary casting of light weight material. The operator usually stands at the left hand end, facing the machine, as it is viewed in Fig. 1, and the work platform 75 slopes upward at a relatively small angle away from the operator's end or toward the right as the machine is viewed in Fig. 1. The carriage is formed with an upwardly extending face 78, adjacent the operator's end and forming with the platform 75 a work holding trough, the faces of which are substantially perpendicular to each other.

A horn 79 is formed integrally with the face 78 of the carriage and is conveniently located to provide a thumb hold which may be grasped by the thumb to pull the carriage toward the operator when it is desired to reciprocate the plate directly or to feed the work by hand without using a pusher plate.

Figure 7:
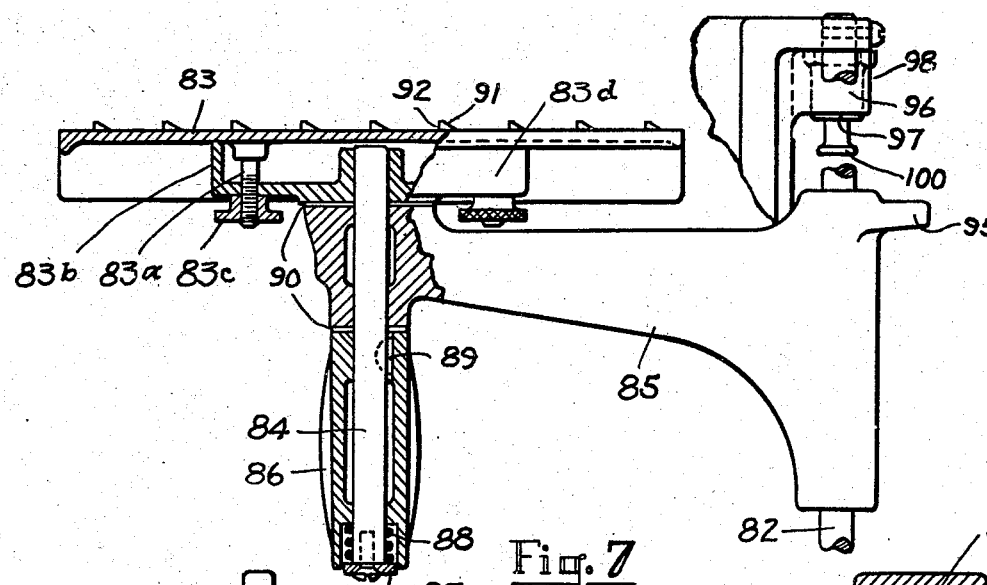
Fig. 7 is a detail view showing the construction of the pusher plate.
Figure 14:
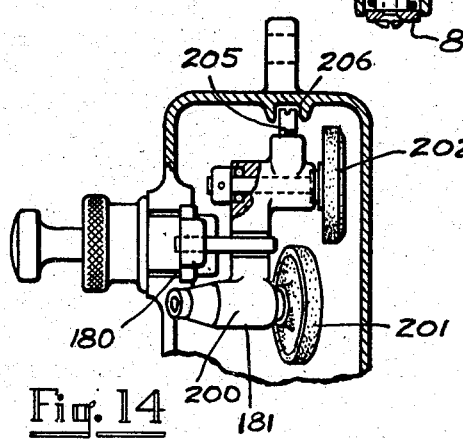
Fig. 14 is a plan view of the grinding unit, the case being broken away to disclose the mechanism to better advantage.

The sloping work platform 75 of the carriage is formed with integral lugs 81 in which is mounted a cross bar 82. This bar serves as a support for a pusher plate indicated generally at 83. The pusher plate carries a plurality of mounting studs 83ᵃ extending from the rear face thereof by means of which the plate is supported from a bracket member 83ᵇ, thumb nuts 83ᶜ being threaded over the ends of the studs to removably hold the plate in place. As indicated in Fig. 7, the bracket closely approaches the wall of the plate and is formed with an encircling flange 83ᵈ which serves to prevent access of material and to maintain the sanitary character of the machine. It will be understood that with this construction substitute plates having different shapes or work engaging surfaces may be readily substituted if desired.

The bracket is attached to a pusher plate shaft 84 which extends through a carrying arm 85, this arm being slidably and rotatably mounted upon the cross shaft 82. The pusher plate shaft 84 is extended beyond the arm 85 to provide a support for the handle 86 which is retained in place thereon by means of a cap 87 fastened over the end of the shaft 84 and retaining a small compression spring 88 in place in a recess formed in the end of the handle. The handle 86 is fastened to the shaft 84 by means of a feather key 89 so that the rotation of the handle causes rotation of the shaft and the pusher plate, the shaft being free to turn in its carrying arm 85. Suitable washers 90 are positioned at each end of arm 35 and the parts are held in close contact against the washers by spring 88 preventing access of material to these parts.

The work engaging face of the pusher plate is formed with means which offers a greater resistance to movement of the work material away from its normal position than to movement of the work toward such normal position. The normal position of the work is closely in contact with the face 78 of the work supporting carriage so that it will be firmly held during the slicing operation and will not turn or move as the work progresses which would result in uneven slices, or fraying out of the ends of the piece. This means comprises a plurality of teeth or ribs, preferably formed integrally on the face of the pusher plate having an inclined face 91, and a substantially perpendicular face 92. The effect of such ribs is to offer little resistance to the movement of the work toward normal position adjacent face 78 of the carriage, but to oppose movement away from normal position. The tendency therefore is for the work to move toward and to be securely held against the face 78 of the carriage. Cleaning of the pusher plate is very easily accomplished by merely wiping across the face with a cleaning rag, preferably in strokes parallel with the ribs whereby the entire face may be readily cleaned.

The bottom of the pusher plate is provided with downwardly extending work holding teeth 93 for gripping the work. Runners 94, extending below the teeth, prevent contact of the teeth with the platform 75.

The pusher plate is supported from the end of the carriage remote from the operator and by reason of the upward slope of the carriage, the pusher plate handle is raised to such an extent that there is little or no interference with the hand of the operator from the adjacent face of the carriage. Consequently he can conveniently hold the pusher plate while reciprocating the carriage.

An extension 95 is formed on the carrying arm and is adapted to cooperate with the two faces of a lug 96 integrally formed upon the forward face of the carriage. If the pusher plate should be raised out of the carriage and should then be moved toward the cutting knife, extension 95 would contact with forward face 97 of the lug 96 to prevent further movement thereof. Only by lowering the pusher plate into the carriage, where it would not strike any of the operating parts of the machine, could it be advanced to its extreme inner position. However, when in such inner position, an extensive raising movement of the pusher plate will bring lug 95 into engagement with the face 98 of the lug to prevent any movement of the pusher plate out of the carriage at such a point that it might strike other parts of the device.

In addition, a stud 100 is screwed into the carriage and is adapted to cooperate with the extension 95 to hold the pusher plate in inoperative position, out of the work carriage, when it is desired for instance to feed the material by hand. The inoperative position of the pusher plate is shown in Fig. 12, with the extension 95 engaged behind pin 100. The position of the plate at this time is such that the carriage can be given its full reciprocating motion and the pusher plate will not strike any other part of the machine, nor interfere with the desired hand feeding operation.

In order to permit the very compact and simple construction of the present device, and to provide the relatively low positioning of the slice tray, the gage plate is so mounted that its mechanism is entirely to one side of the slice tray. For this purpose it is supported from the forward side of the machine and is mounted intermediate the work carriage and the slide rods for supporting the same.

The gage plate is shown at 110, and is attached to a base member 111. For the purpose of attaching the plate to the base, an auxiliary strip 112 is positioned adjacent the plate at the lower and rearward side thereof, the plate being provided with extended slots 113 which permit of the necessary longitudinal adjustment of the plate with respect to the cutting knife so as to give the desired clearance.

As indicated in Fig. 2, the gage plate supporting base is substantially triangular in shape and is adapted to overlie a similarly shaped raised section 115 on the cover member 40. The lower face of the base member 111 and the cooperating upper face 115 of the cover 40 are finished so that a close sliding fit of these parts is obtained whereby downward passage of the food particles through the cover is prevented. The parts are also so closely fitted as to be in substantially lubricant sealed relationship.

The cover member 40 is provided with angularly extending slot portions 116 and 117 located on opposite sides of a central depressed web portion 118. The base member 111 is provided with a cooperating downwardly extending key section 119 which is adapted to have sliding engagement with the sides 118ᵃ of the cover section to provide for sliding movement of the base and associated gage plate in a predetermined path. The parts are so arranged that this movement takes place at an angle of substantially 30 degrees with respect to a line drawn perpendicular to the face of the gage plate. This provides for the desired lengthening of the clearance between the gage plate and the knife as the thickness of the slice is increased. The key 119 is recessed as shown at 120 to reduce the quantity of metal at this point.

A cam plate 125 is bolted to the underside of base 111 by means of bolts 126. In addition a dowel sleeve 127 is provided for the purpose of maintaining accurate predetermined relationship between the base and the cam plate. The underside of the cover is formed, in addition to the web 118, with depending shoulders 118b, lying at each side of the slotted portions. The shoulders are finished and in conjunction with the cam plate 125, provide a strong mounting for the gage plate and base, preventing any tilting thereof.

A bracket 128 is bolted to the underside of cover 40 by means of bolts 129. A vertical face 130 of the bracket is adapted to have guiding engagement with a cooperating face of the cam plate and to provide an adjustment for taking up wear in the slidable gage plate members. For this purpose a plurality of dowel pins 130a are positioned in the lower side of the cover which engage in a groove 130b in bracket 128. The holes in the bracket for bolts 129 are elongated so that upon loosening the bolts, the bracket may be moved toward the cam plate to take up for wear, the pins 130a maintaining proper alignment of the bracket. The bracket also is formed with a depending portion 131 adapted to support the adjacent end of slide-rod 56.

It will be understood therefore that the base 111 is adapted to have a sliding movement in the slots 116, 117 and is at all times supported in correct position therein through the cooperation of the side walls of the slots with the side walls of the key 119, as well as by the cooperation of the cam plate 125 with bracket 128, and tilting movement is prevented through the coaction of the shoulders 118b with the cam plate 125.

Further means are provided for guiding and assuring predetermined alignment of the gage plate during this movement, this means comprising a depending guiding pin 132 located adjacent the other inner angle of the triangular base, the pin 132 extending down through a slot 133 in the cover member 40 and being provided with a washer 134 which overlies the sides of the slot, thereby assuring that movement of the gage plate will take place in the desired angular position and without incurring any danger of misalignment thereof during movement.

Figure 9:
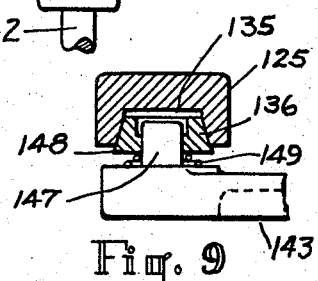
Fig. 9 is a vertical section taken on the line 9—9 of Fig. 6.

Means are likewise provided for imparting the desired adjusting motion to the gage plate and for retaining the gage plate in predetermined adjusted position. This means comprises an arcuate groove 135 formed in an integral section of the cam plate 125. As indicated in Fig. 9, this groove is provided with sides 136 which slope inwardly toward each other.

An operating lever or handle 138 extends above the cover plate on the forward face of the machine and is provided with a shaft portion 139 extending downwardly through a hole in the cover 40. The shaft at the point of passage through the cover is provided with an overlying extended portion 140 of increased diameter which serves to prevent any passage of material downwardly through the cover. A lug 141 extends outwardly from section 42 of the cover and provides a lower bearing for the shaft.

A radially extending operating arm 143 is adjustably attached to the lower end of shaft 139 by means of a split collar 144 and a tightening bolt 145. Also a set screw 146 is provided in the collar for holding the arm at a predetermined position upon the shaft.

The radial arm at its outer end carries an upwardly extending pin 147 upon which is mounted a wedge shaped follower 148. A spring 149 presses the follower into operative relationship in the groove 135 of the cam member, the spring serving to maintain desired frictional engagement of these parts.

Figure 6:
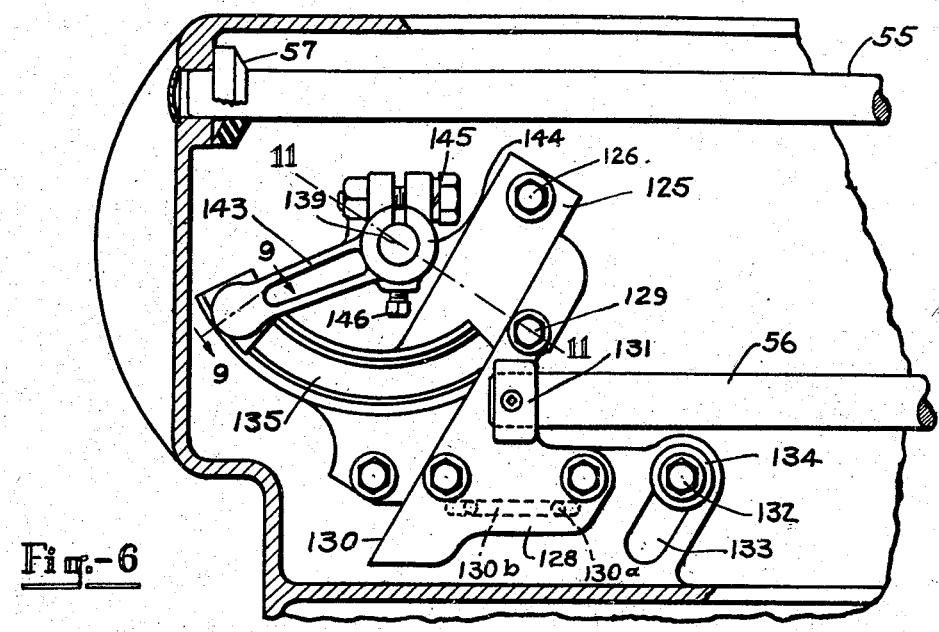
Fig. 6 is a plan view of a portion of the under side of the machine showing the mechanism for adjusting the position of the gage plate.

As indicated in Fig. 6, the center of the circle of which the arcuate cam 135 is a part, is displaced from the axis of shaft 139 about which the follower 148 moves in a circular path. Accordingly as the shaft 139 is turned, the follower correspondingly traverses an arcuate path, and a relative displacement of the cam will necessarily take place. Since motion of the cam plate and associated gage plate is limited to the straight line angular movement described above, the rotation of the shaft 139 will therefore cause the desired adjusting movement of the gage plate closer to or farther from the plane of the rotary knife. The zero adjustment of the gage plate is easily obtained by loosening the set screw 146 and the bolt 145, and rotating the shaft until the desired setting is obtained, whereupon by tightening the collar upon the shaft this adjustment will then be retained throughout the operation of the device.

An important feature of this adjustment mechanism is that by reason of the construction above described, the gage plate will remain in any adjusted position regardless of any forces tending to move it during normal operation and additional holding mechanism is therefore unnecessary. Furthermore, as the movement of the follower progresses in the cam plate, additional increments of movement toward the end of the stroke result in correspondingly greater increments of movement of the gage plate. In other words, initial movement of the handle 138 results in a finer adjustment of the movement of the gage plate than the final movements of the handle where the slices are relatively thick. This is a desirable operation inasmuch as more careful gaging of the slices is desirable where they are thin. The spring 149 also serves to hold the enlarged collar 140 of handle 138 in close fitting relationship with the cover so that food particles can not pass downwardly therethrough, and provides an automatic take-up for wear in the adjusting mechanism.

A calibrated scale 150 cooperating with the handle 138 is located on top of the cover member 40 in easily readable position for the operator, the handle having an aperture 151 through which the scale is visible in conjunction with a marker 152.

Mounted on top of the integral motor and driving-gear housing 23 is a grinder box base 160. A cover 161 is pivotally mounted to cooperate with section 160 to completely enclose the grinding mechanism. The base section 160 is formed at the upper extremity of each side with outwardly extending supporting arms 162, 163 which are formed with holes to provide a support for bolts 164, 165 extending therethrough. These bolts have threaded engagement at their forward ends with bosses 166, 167 attached to the upper portion of the guard plate 45. The cover section is formed with supporting lugs 169 and 170, the latter serving to pivotally support the cover on an extension of arm 163. Lug 169 is open on its under side so that it slips over a corresponding extension on arm 162. When the bolts are tightened, the inner face of the guard plate is pulled up against the lugs which in turn abut against the respective arms 162, 163 so that the grinder box cover and the knife guard plate are firmly held in position, but are so formed that they can be easily disassembled for cleaning or the like. Arm 163 is also provided with an integral extension 171 which serves as a rest for the cover in open position.

The cover section is also formed integrally with a protective extending portion 175 adapted to overlie the exposed portion of the cutting knife between the guard plate and the gage plate. The opposite side of the cover mounting also provides an attaching means for an arcuate shaped shield 176 extending around the exposed forward edge of the cutting knife, the lower end of this shield being attached over a dowel on the top of the cover section 40.

The upper portion of the base or housing section 160 is slotted as shown at 180 and is adapted to receive a unitary grinder assembly 181. This unit is provided with surfaces cooperating with the sides of the slot which permit free vertical movement of the unit in the slot while preventing other movement thereof. The unit comprises a sleeve 182 which has a threaded outer end 183 on which is mounted a holding nut 184. The sleeve likewise is formed with a flange 185 adapted to bear against the inner face of the housing member so that upon the tightening of the nut 184 against the outer face, the entire assembly is rigidly supported from the housing section and can be removed directly upward from the loosening of nut 184. A limiting pin 186 extending above the bottom of this slot 180 provides for returning the unit to a predetermined operative position following removal thereof for purposes of cleaning or the like. It will be understood that the limiting pin 186 will be adjusted downward progressively with the wear of the rotary knife so that the grinding unit will always be maintained in proper operative position.

Slidably mounted in the sleeve 182 is an operating rod 190. This rod extends beyond each end of the sleeve and a handle 191 is threadedly mounted on one end. The pin is provided with a central portion 192 of reduced diameter over which a spring 192ª is placed. Adjacent each end of the spring is a slotted washer 193 of larger outside diameter than the pin. Each washer engages with the pin and also is adapted to engage against the shoulders 194, 195 of the sleeve, the shoulder 195 being provided by means of a removable nut 196 threaded into the sleeve. The nut also provides a guiding and supporting bearing for the pin 190. A single spring thus serves to return the pin to neutral position when displaced axially in either direction, as movement in either direction from that shown will cause a compression of the spring which upon release of the operating handle will return the pin to neutral position.

The pin 190 carries a yoke 200 in which a grinding disc 201 and a burring disc 202 are suitably journaled. As indicated in Fig. 4, the grinding disc 201 is located on the rearward side of the knife while the burring disc 202 extends over the outer face of the knife. A pin 203 fastened to sleeve 182 extends into a slot 204 in the yoke member and prevents rotation thereof while permitting free axial movement.

With the parts in the normal position there is sufficient clearance between the knife and both discs so that neither disc is in operative engagement. However, upon a forward motion of the handle 191 the grinding disc 201 is brought into engagement with the knife. In this movement the spring 192ª is compressed so that when the handle is released the grinder is retracted and the device returns to its normal position. Upon the opposite or a pulling movement of the handle 191 the pin moves the opposite way, and the burring disc is brought into action. Likewise upon release of the handle, the compressed spring will return the parts to their normal position with both discs out of engagement. Thus a very simple grinding device is provided in which a single spring serves to return the parts to their normal position for both the burring and the grinding action.

Because it is sometimes found that meat particles, grease and the like have a tendency to collect in the grinder box, which in some instances is not adequately cleaned by the user, provision is made in the present device for preventing the grinding action except when the cover is in open position. In this way the operator will see the interior of the grinder casing whenever the grinder is used and any necessity for cleaning will be at once apparent. For this purpose a pin 205 is mounted upon the slidable yoke 200 and cooperates with raised ribs 206 formed integrally with the cover member. These ribs prevent movement of the yoke with the grinding wheels in either direction when the cover is in place, and it is only by throwing the cover back that the grinder device can be operated. In case the user does not want this interlock feature but wants to operate the grinder with the cover in closed position, the pin 205 may be removed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A slicing machine of the character described adapted to rest upon the surface of a supporting member comprising an imperforate base member, said base member having a rigid peripheral flange extending around the outside thereof and adapted to contact a supporting surface in sealing and part supporting relation thereto, and supporting members for the base comprising a plurality of resilient members adapted to support a portion of the weight of the machine and having a greater coefficient of friction than said base material to provide resistance to slipping and so constructed as to deform to permit said flange to rest in sealing and part-supporting relation on the supporting surface.

2. A slicing machine of the character described adapted to rest upon the surface of a supporting member comprising a unitary base member of relatively light weight material, said base member having a rigid peripheral sealing flange extending around the outside thereof, and additional means preventing slipping of the base comprising a plurality of frictional elements adapted to support a portion of the weight of the machine and having a greater coefficient of friction than said base material to provide resistance to slipping and so constructed as to permit said flange to rest in sealing and part-supporting relation on the supporting surface.

3. A slicing machine of the character described adapted to rest upon the surface of a supporting member comprising a unitary base member formed of a relatively light weight material, said base member being provided with a rigid peripheral sealing flange, and a plurality of rubber frictional elements adapted to support a portion of the weight of the machine to prevent slipping of the machine, the peripheral flange supporting the remainder of the weight of the machine so that it is maintained in sealing relationship with the supporting member and access of foreign material underneath the base is prevented.

4. A slicing machine of the character described comprising a base, a rotary knife, a plurality of slide rods spaced apart and lying in a generally horizontal plane, a main frame member forming an imperforate cover overlying said rods and having side portions extending downwardly below the level of said rods to prevent passage of material thereto, a work supporting carriage extending across the top of said cover to a position closely adjacent said knife said carriage also having a portion extending laterally beyond said cover member in the direction away from said knife, and a cantilever construction including means extending beneath said imperforate cover on the side remote from said knife and connecting with said portion of the carriage extending beyond the cover member for supporting said carriage in operative position adjacent said rotary knife and overlying said imperforate cover, the carriage being supported in such position that the force of gravity of the carriage and of the work material thereon acts in the direction to tilt the carriage toward the knife.

5. A slicing machine of the character described comprising a plurality of slide rods, a cover adapted to overlie said rods and to prevent passage of material downwardly thereonto, a supporting member slidably mounted upon said rods and extending laterally beyond said cover, said member being formed with guiding and supporting surfaces, a work supporting carriage, means on said supporting member for receiving said carriage and for holding said carriage temporarily in operative position upon the placing of the carriage on the supporting member, and additional means for permanently attaching said carriage to said supporting member.

6. A slicing machine of the character described comprising a plurality of slide rods, a cover adapted to overlie said rods and to prevent passage of material downwardly thereonto, a supporting member slidably mounted upon said rods and extending laterally beyond said cover, said member being formed with top and side guiding and supporting surfaces, a supporting member extending forwardly from said side face, and a work supporting carriage adapted to be mounted upon said member and to overlie said cover, said carriage being formed with cooperating angularly related guiding and supporting surfaces and having a slot adapted to cooperate with said member, whereby said carriage is held in place in operative position upon said supporting member, and additional means for fastening said carriage in said operative position.

7. A slicing machine of the character described comprising a base, a rotary knife, a work supporting carriage, means for supporting said carriage to provide for reciprocating movement with relation to said knife, said carriage comprising a trough having one face adapted to serve as a work supporting platform and another face extending substantially perpendicular thereto against which the work is held in normal operating position, and a pusher plate mounted within said carriage, said pusher plate having means on its work engaging face so constructed as to offer greater resistance to movement of the work away from its normal position than to movement of the work toward its normal position, whereby the work is adapted to be held firmly in the desired position during the slicing operation, said means comprising a plurality of ribs each extending substantially across the face of said pusher plate, the leading face of the ribs on the cutting stroke being inclined to the plane of the pusher plate and the rearward face of said ribs being substantially normal thereto.

8. A slicing machine of the character described comprising a rotary knife, a gage plate, a work supporting carriage, means for supporting said carriage comprising a plurality of horizontally extending rods, an imperforate cover overlying said rods and adapted to prevent passage of material downwardly thereonto, means for adjustably supporting said gage plate from one side of said cover, said cover extending into the plane of said gage plate and preventing the passage of foreign matter therebetween, said means being located above said rods and lying below the level of said carriage to permit unobstructed movement of said carriage, and a control member located on said cover for effecting adjustment of said means.

9. A slicing machine of the character described comprising a base, an adjustable gage plate, a plurality of slide rods supported from said base, a cover overlying and concealing slide rods, means for supporting said gage plate from said cover and at one side thereof in close juxtaposition preventing passage of foreign matter therebetween, a work supporting carriage, and means for supporting said carriage from beneath the opposite side of said cover to overlie said cover and provide for reciprocating movement thereof comprising a slidable member journaled on said rods and extending laterally beyond said cover, means mounted on said cover below the level of said carriage for adjustably positioning said supporting means and said gage plate and gage plate adjusting mechanism located entirely within and above said rods and below said carriage.

10. A slicing machine of the character described comprising a gage plate, a work supporting carriage, a plurality of slide rods on which said carriage is mounted, a cover adapted to overlie said rods to protect the same against access of material downwardly thereto, a base for supporting said gage plate slidably mounted on said cover, means on said base and said cover providing for guiding said gage plate in a predetermined path, and operative connections located on said cover and having a control member for said gage plate adjustably mounted thereon extending above said cover for adjustably positioning said gage plate, said base and said cover being so formed as to have close sliding engagement to maintain the impervious character to the passage of material therethrough.

11. A slicing machine of the character described comprising a rotary knife, a gage plate, means for adjustably mounting said gage plate comprising a slidable gage plate base, means for guiding said base and said gage plate in a predetermined path, and means under the control of the operator for positioning said gage plate as desired including an arcuate cam member mounted on said slidable base, a radial follower cooperating with said cam, the center of said arcuate cam being displaced from the center of said radial follower whereby upon movement of said radial follower, a displacement of said cam with resultant movement of said gage plate is produced.

12. A slicing machine of the character described comprising a gage plate, a gage plate base for supporting said gage plate, a member on which said gage plate base is mounted for sliding movement, said member being provided with a slot cooperating with extended portions on said base whereby said gage plate is guided and supported in sliding relation to said member, and means for adjustably positioning said gage plate comprising an arcuate groove on said base, a pivoted operating handle extending through said member and provided with a follower adapted to seat within said groove, the center of said arcuate groove being displaced from the axis of said handle, whereby upon pivoted movement of said handle resultant displacement of said base together with said gage plate is produced.

13. A slicing machine of the character described comprising a rotary knife, a gage plate, a gage plate base for supporting said gage plate, means for guiding said base and said gage plate in a predetermined path, and means for adjustably positioning said gage plate with respect to said rotary knife and retaining said gage plate in such adjusted position including an arcuate cam member associated with said gage plate base, said cam member being provided with a groove having side surfaces sloping toward each other, an operating handle provided with a radial follower adapted to seat within said groove, said follower being formed with cooperating wedge shaped surfaces, spring means for urging said follower into operative engagement with said groove, the center of said groove being displaced from the axis of said handle, whereby upon movement of said handle resultant displacement of the base together with the gage plate is produced.

14. A slicing machine of the character described comprising a base, a main frame member mounted upon said base, a rotary knife, said knife being formed with a central recessed portion, a guard plate extending within the recessed portion of said knife, means for supporting said guard plate from said frame member, said frame member being formed to slope downwardly from in front of said knife to a point in the rear thereof forming a through cleaning passage so as to discharge crumbs and the like toward the rear of the knife, said guard plate extending closely adjacent and radially beyond the periphery of the knife a limited distance toward the sloping portion of said member to act as a guard for both the front and rear faces of said knife while maintaining said through cleaning passage substantially unobstructed.

15. A slicing machine of the character described comprising a base, a rotary knife, a frame member extending beneath said knife, said member being formed with a recessed portion underlying said knife providing for the reception of scraps and the like, said recessed portion extending from the front face of the knife to the rear face thereof and affording free access for cleaning from the rear of the knife, and a guard member positioned closely adjacent the front face of the knife and extending downwardly toward said recess and radially beneath the periphery of the knife edge, the downwardly extending part of said guard member being spaced above said recessed portion of the frame and providing the sole protection for said knife during the cleaning of said recess from the rear thereof.

16. A slicing machine of the character described comprising a base, a rotary knife supported from said base, a carriage adapted to support the material to be sliced by the knife, guide rods located in a generally horizontal plane, a generally plane imperforate cover overlying said guide rods and extending substantially adjacent the plane of said knife and having a depending marginal flange, a slide member mounted on said guide rods and having a portion extending below and laterally beyond said flange and projecting upwardly to a level not substantially above said cover, said carriage having a downwardly extending supporting part adapted to be received upon the extended portion of the slide in quickly detachable relation thereto, and means for fastening said carriage in operative position upon said portion and overlying said cover.

17. A slicing machine of the character described comprising a base, a rotary knife, a gage plate, a pair of slide rods extending laterally in a substantially horizontal plane, a cover adapted to substantially entirely enclose the top surface of said rods whereby passage of material downwardly thereonto is prevented, said cover likewise extending laterally in effective enclosing relation to the face of said gage plate and of said knife, a gage plate supporting member movable over said cover and providing for maintaining the imperforate character of said cover to passage of material between said cover and said gage plate, adjusting means for said gage plate supporting means mounted on and protected against access of food particles by said cover, a work supporting carriage, and means extending from beneath said cover on the side remote from said knife for supporting said carriage from said rods in overhanging relation with respect to said cover.

18. A slicing machine of the character described comprising a base, a rotary knife, a gage plate, slide rods supported from said base in a substantially horizontal plane, a cover lying closely over said slide rods and also in a substantially horizontal plane, said cover extending in effective enclosing relation beneath said gage plate and said knife, a gage plate supporting member movable over said cover and providing for maintaining the imperforate character of said cover to passage of material between said cover and said gage plate, a supporting member slidably mounted upon said rods beneath said cover and extending laterally beyond said cover on the side remote from said knife, a work supporting carriage, and means for supporting said carriage upon said member in operative position with respect to the knife with the greater part of said carriage overlying said cover.

19. A slicing machine of the character described comprising a base, a rotary knife, a work supporting carriage, means for supporting said carriage to provide for reciprocating movement thereof with relation to said knife, and a pusher plate within said carriage, said pusher plate having a plurality of ribs each extending substantially across the face thereof in a direction generally normal to the supporting surface of said carriage, said ribs having a forward face inclined to the plane of the plate and a rearward face substantially normal thereto.

20. A slicing machine of the character described comprising a base, a rotary knife, a work supporting carriage, means for supporting said carriage to provide for reciprocating movement thereof with relation to said knife, and a pusher plate within said carriage, said pusher plate having a plurality of ribs each extending across a substantial portion of the face thereof, said ribs having a longitudinally extending forward face inclined to the plane of the plate and a similarly extending rearward face substantially normal to the plane of the plate, said faces of each said rib extending toward and terminating closely adjacent each other.

DAVID A. MEEKER.
JOHN C. SLAGER.